United States Patent
Beckmann et al.

(10) Patent No.: US 8,936,281 B2
(45) Date of Patent: Jan. 20, 2015

(54) PRESS FITTING FOR A TUBE

(75) Inventors: Stefan Beckmann, Rhede (DE);
Thomas Kern, Thüngen (DE); Rainer Dittmar, Üchtelhausen (DE)

(73) Assignee: Uponor Innovation Ab, Fristad (SE)

( * ) Notice: Subject to any disclaimer, the term of this patent is extended or adjusted under 35 U.S.C. 154(b) by 0 days.

(21) Appl. No.: 12/219,638

(22) Filed: Jul. 25, 2008

(65) Prior Publication Data

US 2009/0026764 A1 Jan. 29, 2009

(30) Foreign Application Priority Data

Jul. 26, 2007 (EP) ..................................... 07113193

(51) Int. Cl.
*F16L 33/23* (2006.01)
*F16L 13/14* (2006.01)
*F16L 33/207* (2006.01)

(52) U.S. Cl.
CPC ........... *F16L 13/141* (2013.01); *F16L 33/2075* (2013.01); *F16L 2201/10* (2013.01)
USPC .............................. 285/256; 285/259; 29/508

(58) Field of Classification Search
USPC .............................. 285/242, 256, 259; 29/508
See application file for complete search history.

(56) References Cited

U.S. PATENT DOCUMENTS

| | | | | |
|---|---|---|---|---|
| 2,679,409 | A | * | 5/1954 | Spender et al. ............... 285/257 |
| 4,225,162 | A | * | 9/1980 | Dola .......................... 285/139.1 |
| 4,270,777 | A | * | 6/1981 | Fisher .......................... 285/242 |
| 4,564,223 | A | * | 1/1986 | Burrington ................... 285/256 |

(Continued)

FOREIGN PATENT DOCUMENTS

| | | |
|---|---|---|
| DE | 29907585 | 9/1999 |
| DE | 29901935 | 10/1999 |

(Continued)

OTHER PUBLICATIONS http://mdmetric.com/fastindx/uf58_67.pdf "DIN 6799" 2003.

*Primary Examiner* — James Hewitt
(74) *Attorney, Agent, or Firm* — Occhiuti & Rohlicek LLP

(57) ABSTRACT

The press fitting for a tube, particularly for a plastic tube or a plastic/metal compound tube, comprises a fitting body (12) including a support shell (14) for mounting thereon one end of a tube (20) which is to be connected, a press shell (16) which is plastically deformable for pressing against the support shell (14) the end of a tube (20) to be connected that has been mounted on the support shell (14), an abutment element (30) arranged on the press shell (16) and having an abutment face (34) to be abutted by a pressing tool (26) for plastically deforming the press shell (16), and at least one press indication portion (40) projecting from the abutment face (34) of the abutment element (30) and extending externally on the press shell (16) into an acting region (38) within which the pressing tool (26) encloses the press shell (16) during deformation of the press shell (16), the press indication portion (40) being separable from the abutment element (30) by means of the pressing tool (26) during the deformation of the press shell (16). For axial fixation of the press shell (16) relative to the pressing tool (26) during the deformation of the press shell (16), the press indication portion (40) comprises a guidance recess (44) for accommodating a guidance projection (48) of the pressing tool (26), and/or a guidance projection (48) to be accommodated in a guidance recess (44) of the pressing tool (26).

16 Claims, 1 Drawing Sheet

(56) References Cited

U.S. PATENT DOCUMENTS

| | | | | |
|---|---|---|---|---|
| 5,772,262 A * | 6/1998 | Dupont et al. | ............... | 285/257 |
| 5,829,795 A * | 11/1998 | Riesselmann | ............... | 285/256 |
| 6,450,549 B1 * | 9/2002 | Schutz | ............... | 285/256 |
| 6,874,823 B2 * | 4/2005 | Viegener | ............... | 285/256 |
| 7,293,804 B2 * | 11/2007 | Li et al. | ............... | 285/256 |
| 7,384,074 B2 * | 6/2008 | He | ............... | 285/256 |
| 2002/0007547 A1 | 1/2002 | Unewisse et al. | | |
| 2008/0067809 A1 * | 3/2008 | He | ............... | 285/259 |

FOREIGN PATENT DOCUMENTS

| | | | |
|---|---|---|---|
| DE | 29920371 | | 2/2000 |
| DE | 19845720 | | 4/2000 |
| DE | 20013425 | | 1/2001 |
| DE | 19955774 | | 5/2001 |
| DE | 20300918 | | 3/2003 |
| DE | 10 2005 028 558 B3 | | 1/2007 |
| EP | 1081421 | | 3/2001 |
| EP | 1413814 | | 4/2004 |
| EP | 1441165 | | 7/2004 |
| EP | 1 477 719 A1 | | 11/2004 |
| EP | 1538383 A1 | | 6/2005 |
| EP | 1 790 896 A1 | | 5/2007 |
| EP | 1571383 | | 11/2007 |
| EP | 1 596 116 B1 | | 1/2008 |
| EP | 1933073 | | 6/2008 |
| JP | 02221792 A * | 9/1990 | ............. F16L 33/20 |
| WO | WO 2007/031348 A1 | | 3/2007 |

* cited by examiner

PRESS FITTING FOR A TUBE

BACKGROUND OF THE INVENTION

The present invention relates to a press fitting for a tube, the tube being particularly a plastic tube or a plastic/metal compound tube.

Press fittings for tubes generally comprise a fitting body provided with a support shell for mounting thereon the end of a tube which is to be connected. In this arrangement, the press shell and the tube end mounted thereto are surrounded by a plastically deformable press shell which, by means of a press tool, is radially compressed and thus is pressed against the tube so that the tube will both closely abut the press fitting and be fixated thereon.

Further, it is known to provide the press shell (or the fitting body) with an abutment element to be abutted by a pressing tool. Said abutment element serves as a stopper for the pressing tool and for guidance of the pressing tool during the deforming of the press shell.

Finally, it is known to provide the abutment element with press indication portions extending into the region acted on by the press shell. Said press indication portions are arranged in abutment on the press shell externally of the latter and, during the deforming of the press shell, will be separated from the abutment element by means of the pressing tool. Examples of press fittings of the above mentioned type are found in DE 10 2005 028 558 B3, WO 2007/031348 A1, EP 1 790 896 A1, EP 1 596 116 A1 and EP 1 477 719 A1.

During the deformation of the press shell, the pressing tool will by its pressing face engage the press indication portions of the abutment element. In the process, these press indication portions will be bent radially inwardly. In case of inappropriate handling of the press fitting, it may happen that the press shell axially moves relative to the pressing tool, so that the pressing of the press shell does not occur at the prescribed position as defined by the abutment of the pressing tool on the abutment element.

It is the object of the invention to provide a press fitting for a tube, particularly a for plastic tube or a plastic/metal compound tube, wherein the pressing can be handled in a simpler and more reliable manner.

SUMMARY OF THE INVENTION

To achieve the above object, the invention provides a press fitting for a tube, particularly for a plastic tube or a plastic/metal compound tube, which press fitting comprises a fitting body comprising a support shell for mounting thereon one end of a tube which is to be connected, a press shell which is plastically deformable for pressing against the support shell the end of a tube to be connected that has been mounted on the support shell, an abutment element arranged on the press shell and having an abutment face to be abutted by a pressing tool for plastically deforming the press shell, and at least one press indication portion projecting from the abutment face of the abutment element and extending externally on the press shell into an acting region within which the pressing tool encloses the press shell prior to deformation of the press shell, said press indication portion being separable from the abutment element by means of the pressing tool during the deformation of the press shell.

In the above press fitting, it is provided according to the invention that the press indication portion, for axial fixation of the press shell relative to the pressing tool during the deformation of the press shell, comprises a guidance recess for accommodating a guidance projection of the pressing tool, and/or comprises a guidance projection to be accommodated in a guidance recess of the pressing tool.

The press fitting of the invention is provided with features adapted to accomplish a cooperation of the pressing tool with said at least one press indication portion during the pressing of the press shell for thus effecting an axial fixation of the pressing tool and the press shell. For this purpose, the at least one press indication portion comprises a guidance recess to be engaged by a guidance projection of the pressing tool which is formed particularly on the pressing face of the pressing tool, so as to effect an axial fixation of the press shell relative to the pressing tool during the deformation of the press shell. By way of alternative, the locking between the pressing tool and the press shell can be realized by the provision of a guidance projection on the at least one press indication portion, and of a guidance recess formed on the pressing tool and particularly in the pressing face of the latter. Under the patent-right aspect, both of the above presented solutions are to be considered as having equivalent effects.

By the hooking and respectively fixation of the pressing tool on the press shell, it is now not possible anymore that a relative displacement occurs between the press shell and the pressing tool during the pressing process, if the press shell is provided with at least one press indication portion which is acted on by the pressing tool for separating said portion during the deformation process. This measure will increase the reliability of the pressing connection and facilitate the handling of the press fitting.

It is of advantage if the press indication portion is provided with a guidance recess (instead of a guidance projection). Notably, this guidance recess can at the same time serve as a predetermined weakening zone for separation of the press indication portion from the abutment element by use of the pressing tool during the deformation of the press shell. For a predetermined weakening zone, it is advantageous if the element provided with the predetermined weakening zone comprises a weakening of the material. Exactly this is realized by the provision of the guidance recess in the press indication portion. Suitably, the guidance recess is formed as a groove. In any case, the guidance recess will provide a groove effect, thus facilitating the separation of the press indication portion. As a result, the pressing tool comprises, on its pressing face, a guidance projection (e.g. a rib or the like) corresponding in shape to the guidance recess.

When mounting a tube to a press fitting, the usual procedure normally resides in that the pressing tool will be axially shifted onto the press shell until getting into abutment with the abutment element. However, the abutment face of the abutment element has said at least one press indication portion extending therefrom, particularly at a radial distance from the press shell. To allow for a more-reliable movement of the pressing tool over the press indication portion until abutting the abutment face of the abutment element, it is suitably provided that the press indication portion, on its outer side facing away from the press shell and on its end facing away from the abutment face, is formed with an oblique face (run-up face) via which the pressing tool can be axially moved for contacting the abutment element and the abutment face of the abutment element, respectively. Thus, by the tapering of the press indication portion on the free end thereof, the pressing tool, even in case of a merely slight radial distance from the press shell, can be reliably shifted over the latter until contacting the abutment element.

Further, it is of advantage if the press indication portion, in the condition when it is pressed against the press shell, is resilient. As soon as the pressing tool after deformation of the press shell is again removed from the press shell, the separated press indication portion, due to its resiliency, will become detached from the press shell and reliably fall off therefrom, allowing for a reliable visual inspection to verify the press connection. The resilient deformability of the press indication portion is suitably realized by regions of the press indication portion arranged at different radial distances from the press shell, it being preferred that none of said regions is in abutment on the outer side of the press shell.

To still further facilitate the separating of the press indication portion from the abutment element, the press indication portion is suitably formed in the shape of an arc, i.e. is substantially U-shaped, and comprises two legs extending from the abutment face of the abutment element and connected to each other by a base portion. In this arrangement, the base portion is arranged substantially in the circumferential direction of the press shell while the two legs extend substantially in the axial direction of the press shell.

A preferred embodiment of the invention will be explained in greater detail hereunder with reference to the accompanying drawings.

DETAILED DESCRIPTION OF PREFERRED EMBODIMENTS

Figure 1:
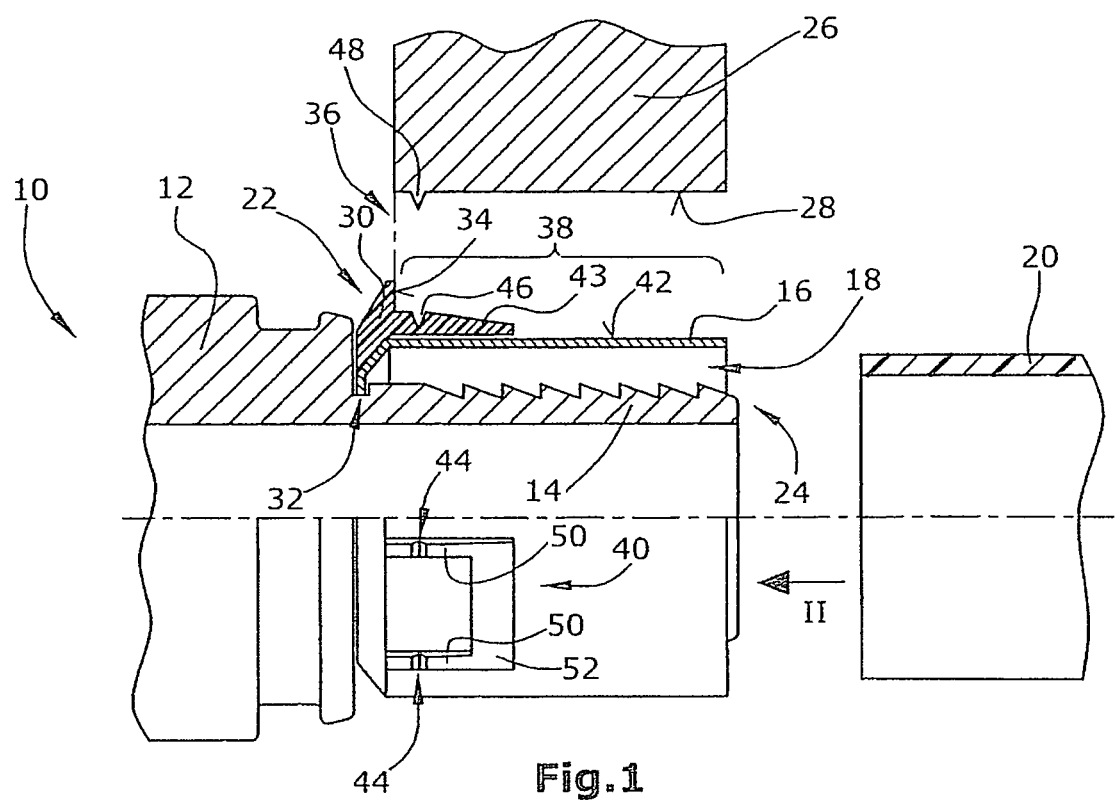
FIG. 1 is a half-sectional view of a press fitting according to a first embodiment.

In FIG. 1, there is shown, in half-sectional view, a press fitting 10 comprising a fitting body 12 (only partially shown) which is made of an e.g. metallic material (metal alloy such as e.g. brass) and includes a support shell 14. Concentrically arranged on support shell 14 is a plastically deformable press shell 16 made of e.g. an aluminum alloy or stainless steel, so that, between press shell 16 and support shell 14, an annular space 18 is formed for receiving a tube 20 which is to be connected. Support shell 14 can have a profiled outer surface as well as a sealing element arranged thereon.

Press shell 16 comprises an abutment element 22 which is arranged on the end of press shell 16 facing away from the free end 24 of support shell 14. Abutment element 22 serves for axial abutment and for guidance of a pressing tool schematically indicated at 26, said pressing tool comprising a pressing face 28 by which the pressing tool 26, for compressing and plastically deforming the press shell 16, engages the latter from the outside. In this embodiment, abutment element 22 is formed as an abutment ring 30. This, however, is not obligatory. Alternatively, for instance, abutment element 22 could also consist of individual elements distributed around press shell 16.

On the holding end 32 of press shell 16 opposite the free end 24 of support shell 14, press shell 16 is pre-mounted to fitting body 12 in a manner which does not need to be described in greater detail. Under the constructional aspect, this pre-mounting can be realized as described in DE 10 2005 028 558 B3.

The abutment ring 30, which normally is made of plastic, comprises an abutment face 34 extending radially from press shell 16 and having the pressing tool 26 abutting thereon as schematically indicated at 36 when the press shell 16 is being deformed. During this deformation process, the pressing face 28 of pressing tool 26 will act from the outside on press shell 16 within an acting region 38.

From abutment ring 30, a plurality of press indication portions 40 extend into said acting region 38. Said press indication portions 40 project from abutment face 34 of the abutment ring 30 along the axial extension of press shell 16, are arranged at a radial distance from the outer side 42 of press shell 16, and, on their ends facing away from ring element 30, are tapered and comprise oblique surfaces 43. The press indication portions 40, of which only one is required for realizing the invention, are provided with guidance recesses 44 which in the present embodiment are formed as grooves 46. These guidance recess 44 are provided to be immersed by guidance projections 48 of pressing tool 26. Said guidance projections 48 are formed on pressing face 28, as illustrated in FIG. 1.

In the pressing process, the cooperation of guidance projections 48 with guidance recess 44 will result in an axial fixation of press shell 16 on pressing tool 26; this axial fixation is maintained also during that phase in which the press indication portions 40 under the influence of pressing tool 26 are deformed until their separation in the region of the guidance recesses 44 occurs. In this manner, there is effected a reliable pressing of press shell 16 at the desired site and in the desired extent, although the press indication portions 40 extend into the acting region 38 of press shell 16.

As can be seen in FIG. 1, each press indication portion 40 is substantially U-shaped and comprises two thin legs 50 which are connected to each other via a base portion 52 extending in the circumferential direction of press shell 16. The thin legs 50 and guide grooves 46 are effective for a reliable separation of press indication portion 40 or the destruction thereof during a pressing process.

During said press-on process, as described above, the press indication portions 40 are acted on via the pressing face 28, which is effected in that the press indication portions 40 are pressed against press shell 16. In this situation, the danger exists that the separated parts of the press indication portions 40 happen to get pressed from outside against the press shell 16. This danger arises particularly if the press shell 16 is made of a relatively soft material such as e.g. aluminum or an aluminum alloy.

Figure 2:
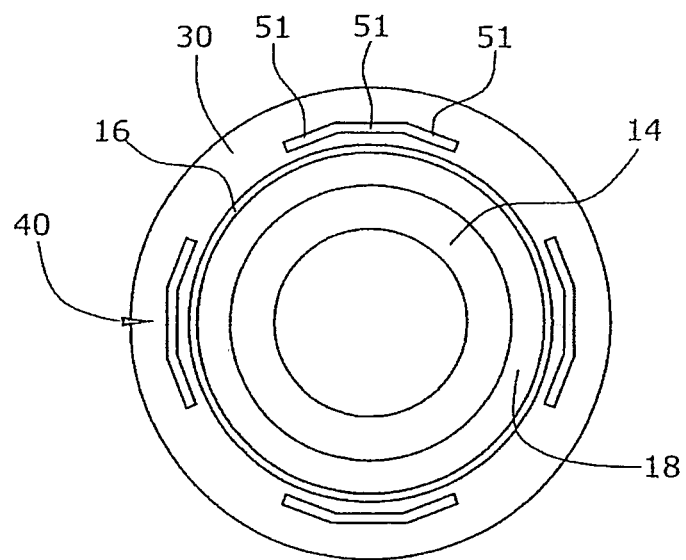
FIG. 2 is a view taken in the direction of arrow II FIG. 1.

To facilitate the automatic detachment of the press indication portions 40 from press shell 16 after the deformation and after the separation from abutment ring 30, it is useful if the press indication portions 40 are resettable after having been pressed against press shell 16. By this ability to be resettable, the separation or renewed separation of the press indication portions 40 and the outer side 42 of press shell 16 is facilitated. The shape of the press indication portions 40 for realizing said resettability is evident e.g. in FIG. 2. The base portions 52 of the press indication portions 40 can have a polygonal shape or a W-structure, for instance, wherein they are composed of regions 51 arranged at different radial distances from press shell 16. The base portions 52, by being flatly pressed against press shell 16 by pressing tool 26, will undergo an elastic deformation, thus building up a resetting force allowing the base portions 52 to be detached from the outer side 42 of press shell 16 after press shell 16 has returned to the condition of being spaced from press shell 16.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A press fitting for a plastic or a plastic/metal compound tube, comprising:
 a fitting body including a support shell configured for mounting thereon one end of a tube to be connected;
 a pressing sleeve which is plastically deformable for pressing against the support shell and the end of the tube having been mounted on the support shell;
 an abutment element continuously surrounding the pressing sleeve and including an abutment face configured to be abutted by a pressing tool when plastically deforming the pressing sleeve; and
 at least one substantially U-shaped press indication portion including two legs projecting from the abutment face of the abutment element and a base portion connecting the two legs and defining a space between the two legs and the base portion, each of the legs having a guidance groove formed therein, the guidance grooves defining a weakening zone, the press indication portion extending along an outside of the pressing sleeve into an acting region within which the pressing tool interacts with the pressing sleeve during the deformation of the pressing sleeve, said press indication portion being separable at the weakening zone by the pressing tool during the deformation of the pressing sleeve,
 wherein the at least one press indication portion includes, on its outer side, which faces away from the pressing sleeve and faces away from the abutment face, an inclined surface having an inclination angle along a longitudinal axis of the pressing sleeve over which the pressing tool can be axially moved for contacting the abutment element, wherein the guidance grooves allow for axial fixation of the pressing sleeve relative to the pressing tool by accommodating a guidance projection of the pressing tool during the deformation of the pressing sleeve, and wherein the press indication portion separates from the abutment element at the guidance grooves upon deformation by the pressing tool.

2. The press fitting according to claim 1, wherein the guidance grooves form a predetermined weakening zone for separating the press indication portion by the pressing tool during the deformation of the pressing sleeve.

3. The press fitting according to claim 1, wherein the press indication portion in its condition of being pressed against the pressing sleeve is elastically deformed and is automatically resettable while becoming detached from the pressing sleeve.

4. The press fitting according to claim 1, wherein the press indication portion comprises regions arranged at different radial distances from the pressing sleeve.

5. The press fitting according to claim 4, wherein all of said regions arranged at different radial distances from the pressing sleeve are radially spaced from the pressing sleeve.

6. The press fitting according to claim 1, further comprising a plurality of said press indication portions.

7. The press fitting according to claim 1, wherein the inclined surface extends from the guidance grooves to an extremity of the press indication portion distal the abutment face, and converges toward the pressing sleeve.

8. The press fitting of claim 1 wherein a distance between the guidance grooves and the abutment element is configured to cause the pressing tool to be fixed at a defined position relative to the press indication portion.

9. The press fitting of claim 1 wherein the abutment element is configured to remain on the pressing sleeve upon deformation of the pressing sleeve by the pressing tool.

10. The press fitting of claim 1 wherein the guidance grooves are axially arranged between the abutment face and the inclined surface.

11. The press fitting according to claim 1, wherein said base portion of the press indication portion is composed of base regions arranged at different radial distances from the pressing sleeve.

12. A press fitting for a tube, comprising:
 mounting means for mounting a tube end of the tube thereon;
 plastically deformable means for plastically deforming against a fitting body means and the tube end;
 aligning means for aligning a pressing tool for plastically deforming said plastically deformable means, said aligning means including an abutment element continuously surrounding the plastically deformable means and having an abutment face for abutment of a pressing apparatus to deform said plastically deformable means; and
 guiding means for guiding axial fixation of the pressing tool relative to said plastically deformable means, said guiding means including an inclined surface having an inclination angle along a longitudinal axis of the plastically deformable means on an outer side thereof facing away from said plastically deformable means and facing away from the abutment face, the inclined surface extending from an extremity of said guiding means distal the abutment face, and converging toward said plastically deformable means, fixation means for axially fixing the pressing tool, the fixation means including a weakening means, wherein the guiding means separates from the abutment element at the weakening means upon deformation by the pressing tool; and
 wherein the guiding means is substantially U-shaped and includes two legs projecting from the abutment face and a base portion connecting the two legs and defining a space between the two legs and the base portion, and wherein the fixation means includes a groove formed in each of the legs, the grooves defining the weakening means.

13. The press fitting according to claim 12, wherein the pressing apparatus can be axially moved over the inclined surface for contacting said aligning means.

14. The press fitting according to claim 12, wherein said guiding means, in its condition of being pressed against said plastically deformable means, is elastically deformed and is automatically resettable while becoming detached from plastically deformable means.

15. The press fitting according to claim 12, wherein said guiding means comprises regions arranged at different radial distances from said plastically deformable means.

16. The press fitting of claim 12 wherein a distance between the fixation means and the aligning means is configured to cause the pressing tool to be fixed at a defined position relative to the guiding means.

* * * * *